W. G. PREDDEY.
LENS TEMPERATURE EQUALIZER.
APPLICATION FILED MAR. 24, 1914.

1,111,093.

Patented Sept. 22, 1914.

WITNESSES
O. H. Fiddes
Mo. Daves

INVENTOR
Walter G. Preddey

UNITED STATES PATENT OFFICE.

WALTER G. PREDDEY, OF SAN FRANCISCO, CALIFORNIA.

LENS-TEMPERATURE EQUALIZER.

1,111,093.    Specification of Letters Patent.    Patented Sept. 22, 1914.

Application filed March 24, 1914. Serial No. 826,912.

*To all whom it may concern:*

Be it known that I, WALTER G. PREDDEY, a citizen of the United States, residing at San Francisco, in the county of San Francisco and State of California, have invented certain new and useful Improvements in Lens-Temperature Equalizers, of which the following is a specification.

My present invention relates to new and useful improvements in lens temperature equalizers, and particularly for equalizing the temperature of that class of lenses in which a high temperature light is projected through the same; such lenses as now commonly used in stereopticon and moving picture machines.

This invention has for its object primarily, to provide a lens temperature equalizer of the above description which will keep the temperature at all parts of a lens uniform when said lens is rising from atmospheric temperature to running temperature, and cooling from running temperature to atmospheric temperature.

A further object is to provide a lens temperature equalizer which will be convenient to install, simple in construction and readily assembled.

With these ends in view my invention consists in the details of construction and combination of elements hereinafter set forth, and then specifically designated by the claims.

Its construction and operation will be described in detail, referring by numerals to the accompanying drawings forming a part of this specification; and in which similar numerals of reference designate corresponding parts in all figures.

Figure 1:
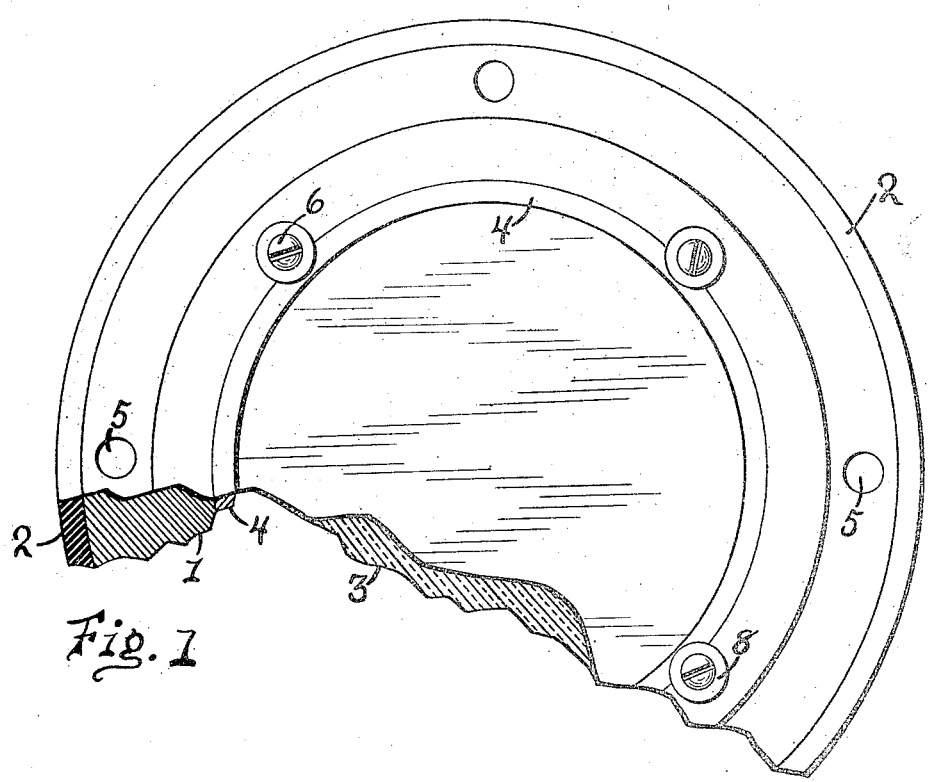
Figure 2:
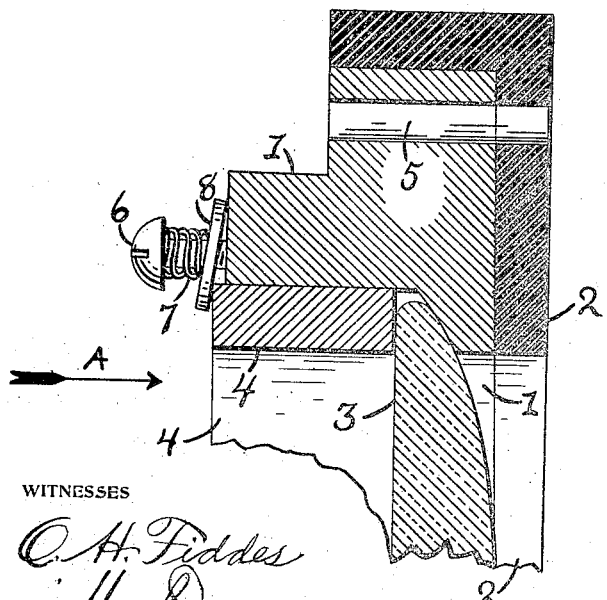

In the accompanying drawings:—Figure 1, is a broken front elevation of the lens temperature equalizer containing an ordinary lens. Fig. 2, is an enlarged fragmentary central vertical transverse cross section of Fig. 1.

Referring to the drawings, 1 indicates a lens housing which may be made of any suitable heat conducting and heat retaining material, such as brass or copper, and which may be of any given size, shape or proportions. A nonconductor of heat 2 such as asbestos is shown covering a portion of the outside surface of the lens housing 1. An ordinary lens 3 is shown encircled by the lens housing 1. A ring 4 loosely fitting inside of the lens housing 1, forms an outward limiting position for lens 3 and keeps said lens in its proper position against the convex flange forming a part of the lens housing 1. A plurality of holes 5 are shown drilled through the lens housing 1 and the heat insulating material 2, and is a means by which the lens housing 1 may be attached to an ordinary lens holder of a stereopticon or moving picture machine. A plurality of screws 6 screw-threaded into the lens housing 1, and compression springs 7 under the heads of said screws, said springs forcing in on the washers 8 which in turn forces in the ring 4 and effects a constant pressure of the lens housing 1 and the ring 4 on the surface of the lens 3.

Heretofore, it has been the experience when projecting a high temperature light through an ordinary lens, and particularly in turning on and turning off said light, that the lens will frequently crack, which is caused by the outer edge which is of a much smaller cross section than the center portion, cooling off more rapidly than the center, thus effecting undue tension of said lens which causes the rupture of the same.

The operation of this device will then be as follows: It is obvious that in projecting a light of high temperature through a lens contained by my improved lens temperature equalizer, that the thin edge of said lens will be relieved of its excess of heat over the center or thicker portion of the same, by the conduction of heat from said thin edge of said lens to the lens housing 1. The lens housing 1 should be constructed so as to be of greater proportions than the lens contained therein, so that said lens will absorb more heat in a given time than said housing 1, this being the case the lens housing 1 will conduct the heat from the thin edge of said lens, and thus equalize the temperature of the same. It is evident then that after the lens housing 1 and the lens 3 have been in operation for a time that both will be of uniform temperature, then if the light is turned off, the lens housing 1 being of greater volume will retain its heat longer than the lens contained therein, and will impart heat to the outer edge of said lens which will keep the temperature of said outer edge of said lens uniform with the center portion of the same while cooling, thus equalizing the temperature of all parts of said lens. The nonconductor of heat 2 covering a portion of the housing 1 is to conserve the heat absorbed by said housing and is intended to cover all of said housing 1 which is not exposed to the light which strikes it when said light is projected through lens 3; said light is projected through lens 3, in the direction of the arrow A Fig. 2. The part of the lens housing 1 and the ring 4 that comes in contact with the edge of lens 3 is preferably shaped to the same radius as the lens 3 so as to insure good contact surface for the heat to pass and repass from lens 3 to lens housing 1.

Many variations may be made in the form of this device from that set forth, without departing from the scope of the invention. Thus, any suitable means may be used to keep a constant pressure of the lens 3 to the housing 1 than that here shown, also, a different means of retaining the lens 3 in the housing 1 than that shown may be used. The lens housing 1 may be attached in any suitable manner to the machine in which it is to be used. The heat insulating material 2 may in certain cases be dispensed with.

Having thus fully described my invention, what I claim is—

1. A lens temperature equalizer comprising a heat absorbing lens housing, said lens housing consisting of sufficient volume to absorb heat from and impart heat to the peripheral portions of a lens contained therein, as and for the purpose herein set forth.

2. A lens temperature equalizer comprising a heat absorbing lens housing, said lens housing providing for lens retention, and said lens housing consisting of sufficient volume to absorb heat from and impart heat to the peripheral portions of a lens contained therein, as and for the purpose herein set forth.

3. A lens temperature equalizer comprising a heat absorbing lens housing, said lens housing providing for lens retention, said lens retention being expansive and contractive, and said lens housing consisting of sufficient volume to absorb heat from and impart heat to the peripheral portions of a lens contained therein, as and for the purpose herein set forth.

4. A lens temperature equalizer comprising a heat absorbing lens housing, said lens housing having a duct through the same, said duct providing for lens retention, and said lens housing consisting of sufficient volume to absorb heat from and impart heat to the peripheral portions of a lens contained therein, as and for the purpose herein set forth.

5. A lens temperature equalizer comprising a heat absorbing lens housing, said lens housing having a duct through the same, said lens housing consisting of sufficient volume to absorb heat from and impart heat to the peripheral portions of a lens contained therein, as and for the purpose herein set forth.

6. A lens temperature equalizer comprising a heat absorbing lens housing, said lens housing having a duct through the same, said duct containing inward and outward lens limiting projections, said projections conforming to the curvature of lens contained therein, and said lens housing consisting of sufficient volume to absorb heat from and impart heat to the peripheral portions of a lens contained therein, as and for the purpose herein set forth.

7. A lens temperature equalizer comprising a heat absorbing lens housing, said lens housing having a duct through the same, said duct containing inward and outward lens limiting projections, said projections being expansive and contractive, and said lens housing consisting of sufficient volume to absorb heat from and impart heat to the peripheral portions of a lens contained therein, as and for the purpose herein set forth.

8. A lens temperature equalizer comprising a heat absorbing lens housing, said lens housing having a duct through the same, said duct containing inward and outward lens limiting projections, said projections being expansive and contractive and conforming to the curvature of lens contained therein, and said lens housing consisting of sufficient volume to absorb heat from and impart heat to the peripheral portions of a lens contained therein, as and for the purpose herein set forth.

9. A lens temperature equalizer comprising a heat absorbing lens housing, and said lens housing partly covered by an insulator of heat, substantially as herein set forth.

In testimony whereof I have hereunto set my hand in presence of two subscribing witnesses.

WALTER G. PREDDEY.

Witnesses:
  O. H. FIDDES,
  Mo. DAVIS.